United States Patent [19]

Damrau et al.

[11] 4,397,097
[45] Aug. 9, 1983

[54] GAUGE FOR MEASURING ROLL NIPS

[75] Inventors: Wayne A. Damrau; James R. Arrington, both of Wisconsin Rapids, Wis.

[73] Assignee: Consolidated Papers, Inc., Wisconsin Rapids, Wis.

[21] Appl. No.: 313,789

[22] Filed: Oct. 22, 1981

[51] Int. Cl.³ .................... B21B 37/00; G01B 5/14
[52] U.S. Cl. ........................................ 33/182; 72/35
[58] Field of Search ............ 33/172 B, 174 M, 178 R, 33/182; 72/35

[56] References Cited

U.S. PATENT DOCUMENTS

| | | | |
|---|---|---|---|
| 2,032,584 | 3/1936 | Lengel et al. | 33/182 |
| 2,383,272 | 8/1945 | Page | 33/172 B |
| 2,713,209 | 7/1955 | Brown | 33/172 B |
| 3,646,686 | 3/1972 | Kreiskorte | 33/182 |
| 3,718,019 | 2/1973 | Box et al. | 33/182 |
| 4,131,004 | 12/1978 | Eibe | 33/182 |
| 4,186,579 | 2/1980 | Eibe | 72/35 |

FOREIGN PATENT DOCUMENTS

| | | | |
|---|---|---|---|
| 166626 | 3/1959 | Sweden | 33/182 |
| 2066473 | 7/1981 | United Kingdom | 33/182 |

*Primary Examiner*—Richard R. Stearns
*Attorney, Agent, or Firm*—Gary, Juettner & Pyle

[57] ABSTRACT

A gauge for measuring the size of a nip between a pair of rolls is characterized by a cylindrical carrier within which a platform is mounted for pivotal movement about the carrier axis. A transducer is carried on the platform, and a quasi U-shaped rod or probe is pivotally connected at one end with the platform, extends along a medial portion thereof outwardly of the carrier and presses against the transducer at an opposite end. The probe is pivotally urged in a direction outwardly of the carrier, and in use of the gauge the medial portion of the probe is moved into the nip between the rolls and against the rolls and the carrier into contact with the rolls, whereby the transducer provides a readout in accordance with the radii of the rolls at the point of contact by the probe. The gauge may be slid along the length of the rolls, thereby to measure small variations in the radii of the rolls along the lengths thereof, and therefore in the size of the nip and the pressures exerted on sheet material passed through the nip. Because of the quasi U-shape of the probe, the probe may easily be slid along the rolls, and the cylindrical carrier and pivotally mounted platform enables the gauge to be used with rolls having different diameters.

9 Claims, 3 Drawing Figures

GAUGE FOR MEASURING ROLL NIPS

BACKGROUND OF THE INVENTION

The present invention relates to an improved gauge for measuring the nip between a pair of rolls.

In manufacturing operations in which a sheet of material is squeezed through a rolling nip defined between a pair of rolls, such for example as in the production of hot rolled strip metal or paper, it is desirable that the nip be uniform in size along its length so that uniform pressures are exerted on the sheet of material. However, it often happens that variation in the radii of the rolls along their lengths, as well as nonparallelism of the rolls, lead to variations in nip size and therefore rolling pressures.

To determine the size of a rolling nip or variations thereof along its length, thereby to ascertain the pressures exerted on sheet material in the nip and/or roll adjustments necessary to eliminate or at least minimize any variations, the material may itself be examined after it has passed through the nip. However, it is usually more convenient to directly measure and obtain a profile of the size of the nip at various points along its length, and for the purpose nip gauges may be used.

One type of gauge for measuring the nip between a pair of rolls is disclosed in U.S. Pat. No. 4,186,579, which issued to Werner W. Eibe on Feb. 5, 1980. As taught therein, a device for measuring uniformity of pressure exerted in the nip between a pair of rolls comprises a body having a pair of support spheres which are held against the rolls and a sensing sphere at an end of a plunger carried in and urged outwardly of the body. The sensing sphere engages the circumference of the rolls, and a transducer generates signals representative of the amount of extension of the plunger from the body as a result of variations in the radii of the rolls.

Another nip gauge similar to that in said patent to Eibe is disclosed in German Pat. No. 826,201, which includes a body having a transducer therein and a plunger extending therefrom the end of which carries a pair of rollers. The rollers are moved toward the nip into engagement with the circumference of the rolls, and the transducer generates signals representative of the amount of extension of the plunger from the body as a result of the nip dimension.

Although the aforementioned nip gauges provide measurements of the size of the nip between a pair of rolls, the measurements are generally a linear function of roll radii or parallelism variations, and therefore are not extremely accurate with respect to any particular measurement. In addition, since it is necessary for the spherical tip or rollers to extend well into the nip to obtain accuracy, the tip or rollers must necessarily be quite small. When dragging along the nip, the spherical tip or rollers tend to jam and chatter, preventing smooth and accurate measurement taking. Thus, those gauges could not conveniently be used in obtaining, for example, a nip profile of supercalender rolls used in the papermaking industry, inasmuch as the surfaces of such rolls are formed of compressed cotton, and would therefore be prone to cause snagging if a gauge of the Eibe or German patent type were slid along the length of the nip. In addition, by virtue of the particular construction of the devices of Eibe and the German patent, the same are not suited for use in measuring the size of a nip between a pair of rolls of different diameters.

OBJECTS OF THE INVENTION

An object of the present invention is to provide a gauge for measuring the size of a nip between a pair of rolls, wherein a multiplication effect is incorporated in the measurement to increase the accuracy of the same.

Another object is to provide such a gauge, which may be used to obtain the size profile of a nip between a pair of rolls simply by sliding the gauge along the nip, irrespective of whether the rolls have nondeformable or relatively deformable surfaces.

A further object is to provide such a gauge which may be used to measure the nip between a pair of rolls of different diameters.

SUMMARY OF THE INVENTION

In accordance with the present invention, a gauge for measuring the nip between and/or the radii of a pair of working rolls comprises carrier means; transducer means mounted on said carrier means for converting the width of the nip and/or the radii of the rolls into a signal; a quasi U-shaped bent rod or probe pivotally connected at one end to said carrier means, extending along a medial portion thereof outwardly of said carrier means and having an opposite end positioned for movement against said transducer means to operate said transducer means to generate said signal; and means for pivotally urging said probe in a direction outwardly of said carrier means. Said carrier means is dimensioned for insertion into the nip between the rolls and into contact with the rolls at a point outwardly of a centerline therebetween to bring the outermost portion of said medial portion of said probe into contact with the rolls outwardly of but closer to the centerline with said probe lying in a plane generally parallel to the axes of the rolls, and said probe is pivotable against said urging means away from the centerline to move said opposite end thereof against said transducer means, whereby said transducer means converts the width of the nip and/or the radii of the rolls at the point of contact of said probe with the rolls into a signal representative thereof.

In a preferred embodiment of the invention, said carrier means comprises a generally tubular carrier having an opening in a surface thereof and a platform supported in said tubular carrier for pivotal movement about the axis of said tubular carrier. Said transducer means is mounted on and said one end of said probe is pivotally connected to said platform, and said medial portion of said probe extends outwardly of said tubular carrier through said opening. Said probe lies in a plane generally parallel to said axis of said tubular carrier, and said tubular carrier is insertable into the nip into line contact with each roll, said line contact extending along the surface of said tubular carrier parallel to said axis thereof.

The foregoing and other objects, advantages and features of the invention will become apparent upon a consideration of the following detailed description, when taken in conjunction with the accompanying drawings.

DETAILED DESCRIPTION

Figure 1:
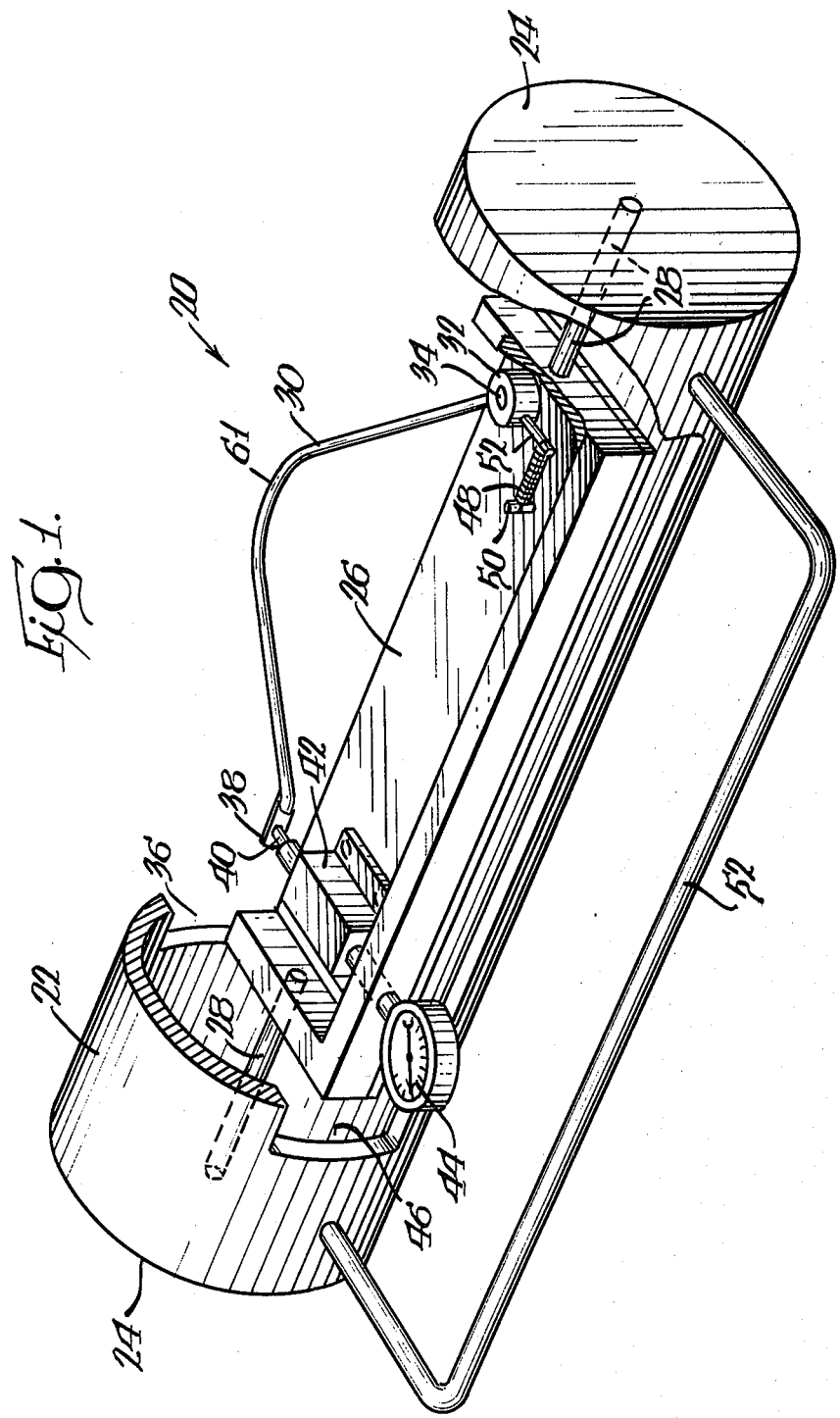
FIG. 1 is a partially fragmentary, perspective view, of a gauge for measuring the size of a nip between a pair of rolls, which is constructed in accordance with the teachings of the present invention.

FIG. 1 of the drawings shows a gauge, constructed in accordance with the teachings of the invention, for measuring the size of a nip between a pair of rolls. Essentially, the gauge measures the radii, radius and/or nip pressure of the rolls and/or variations therein along the length of the rolls. It is desirable to be able to make such measurements in manufacturing processes in which sheets of material are squeezed or passed through a rolling nip, inasmuch as it is usually required to control the pressures and uniformity of pressures exerted on the material as it passes through the nip, and the size of the nip influences the pressures. Such processes are found, by way of example, in the papermaking, steel, aluminum, plastics and printing industries.

More particularly, the gauge is indicated generally at 20 and includes a cylindrical carrier 22 having side walls 24. A platform 26 within the carrier is mounted for pivotal or rotational movement generally about the axis of the carrier by means of a pair of rods 28 suitably journaled in either the platform or carrier side walls, and one end of a quasi U-shaped bent wire, rod or probe 30 is pivotally or rotatably mounted on the platform 26 by means of a sleeve 32 rotatably received about a post 34 extending upwardly from the platform. The shape of the probe is such that a medial portion thereof, or the closed end of the "U", extends outwardly of the carrier through a generally rectangular and elongate opening 36 formed therein, and an opposite end 38 of the probe is flattened and extends back into the carrier through the opening.

The end 38 of the probe 30 is adapted to engage the end of and depress a plunger 40 of transducer means, such as an LVDT or dial micrometer 42 carried on the platform 26. The micrometer includes an indicator or dial portion 44 which extends outwardly of the carrier through a second generally rectangular and elongate opening 46 in a side wall thereof opposite from the opening 36, whereby the readout from the indicator may be viewed by a user of the gauge. The probe is normally urged in a direction outwardly of the carrier through the opening 36 by means of a spring 48 extended between a post 50 on the platform and an arm 52 on the sleeve 32, and a handle 54 facilitates carrying and manipulation of the gauge. As is apparent, movement of the probe inwardly of the carrier depresses the plunger of the transducer to generate a readout representative of the relative positions of the probe and carrier, and in particular of the amount of extension of the probe outwardly of the carrier.

Figure 2:
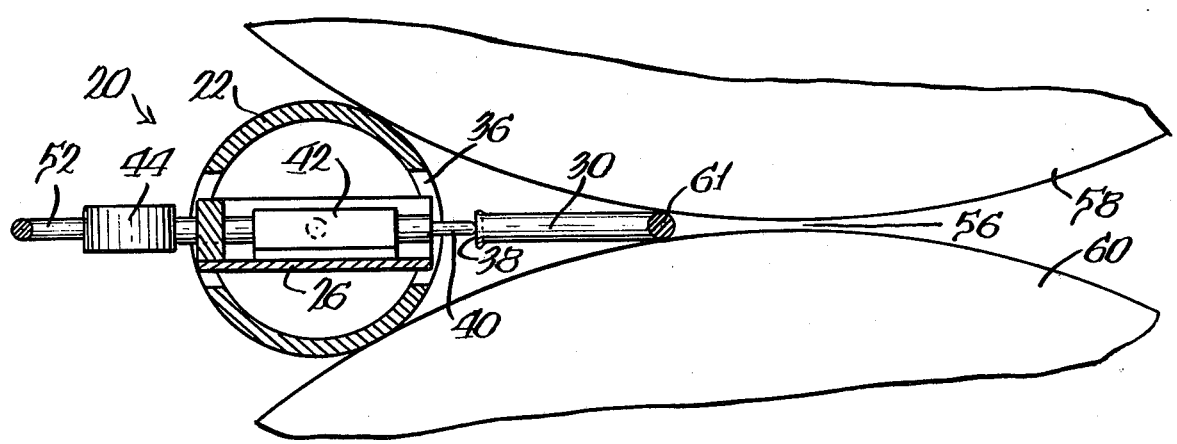
FIG. 2 is a cross-sectional side elevation view of the gauge, showing the same in position to measure the nip between a pair of rolls having like diameters.

FIG. 2 illustrates use of the gauge 20 in measuring the size of a nip 56 between a pair of rolls 58 and 60 and/or the radii of the rolls. As is seen, the probe 30 is inserted into the nip until it engages the circumference of the rolls at a point whereat roll separation is substantially equal to the diameter of the probe, and until the carrier 22 is moved or pressed against the circumferences of the rolls at a point outwardly from an end 61 of the probe. At this time, the probe is gently being urged against the rolls by the spring 48, and the readout provided by the indicator 44, in response to inward movement of the plunger 40 of the transducer 42 by the end 38 of the probe, represents the size of the nip and/or the radii of the rolls at the point of contact therewith by the end of the probe.

As is apparent, the actual parameters measured depend upon the rolls and the conditions of measurement. Essentially, the measurement made is the distance from the centerline of the rolls 58 and 60 to a point where the roll circumferences have diverged a fixed distance, or to the point whereat the circumferences are engaged by the end 61 of the probe 30. By rather complex calculations which form no part of the present invention, the actual radii and pressures exerted by the nip can be measured. However, it is usually desired and sufficient to merely obtain a profile of relative changes in nip size or roll radii along the length of the rolls, rather than absolute values.

To obtain a profile of nip size or radii variations of the rolls, with the gauge positioned as shown at one end of the rolls, it may simply be slid along the rolls within the nip from the one end of the rolls to the other, and variations in the readout provided by the transducer 44 noted. If one roll is perfectly cylindrical, the readout will indicate variations in the radius of the other roll. If neither roll is perfectly cylindrical, then the readout indicates variations in the algebraic sum of the roll radii. In general, the radii measurements of the rolls are proportional to the pressures which will be exerted locally on sheet material passing through the nip between the rolls.

If desired, by placing the probe on the outgoing side of the nip and slowly rotating the rolls, the "roundness" profile of the roll pair may be obtained.

It is to be appreciated that the particular construction of the gauge 20 enhances the accuracy of measurements made. Because the carrier 22 has a relatively large diameter and contacts the circumference of the rolls a significant distance from the centerline therebetween, its movement in or out from the centerline will only be a fraction of any roll radii changes. On the other hand, the outer end 61 of the probe 30 is relatively closely spaced from the centerline, and therefore moves, with respect to the carrier, a distance equal to several times any change in roll radii, depending upon the rolls and wire diameters. In addition, because the probe is formed into a quasi U-shape, is pivoted at one end and contacts the rolls at its center, the probe itself provides an additional gain of two in the motion of the plunger 40 as compared with the distance the end of the probe moves in response to roll radii changes. Thus, the particular geometry of the gauge enables large magnifications and increased accuracies to be obtained in nip size and roll radii measurements.

The gauge 20 is particularly useful in obtaining a profile of nip size and/or roll radii variations in the case where the circumference or surface of one or both of the rolls is made of a relatively deformable material, such for example where one of the rolls is a supercalender roll as found in the papermaking industry. The outer portion of a supercalender roll is usually made of tightly compressed cotton, which while exhibiting some degree of hardness is nevertheless relatively deformable and loose as compared with metal. A supercalender roll ordinarily cooperates with a metal roll to define a nip through which paper sheet is passed, and the rolls are rotated at different speeds to impart a desired surface finish to the paper. For uniformity in appearance and surface texture of the finished paper product, it is desirable that even pressures be exerted on the paper along the entirety of the length of the roll nip.

If a conventional gauge having a relatively limited area sensing tip were used to measure the roll radii of a supercalender and metal roll, for example a gauge as disclosed in said U.S. Pat. No. 4,186,579 or said German Pat. No. 826,201, the sensing tip at the end of the probe would tend to dig or sink into the relatively deformable surface of the supercalender roll, resulting in inaccurate measurements. At the same time, such gauges would not be suitable for obtaining a profile of nip size or roll radii variations simply by sliding the gauge along the length of the rolls, inasmuch as the sensing tips of those gauges would tend to chatter on the surface of the supercalender roll as the gauge is slid therealong, resulting in inaccuracies in measurements or rendering measurement taking impossible. On the other hand, in use of the gauge of the present invention to measure the nip between a supercalender and a metal roll, because of the relatively gentle curvature of the quasi U-shaped outer end of the probe 30, the probe may easily be slid within and along the length of the nip without snagging on the surface of the roll.

Figure 3:
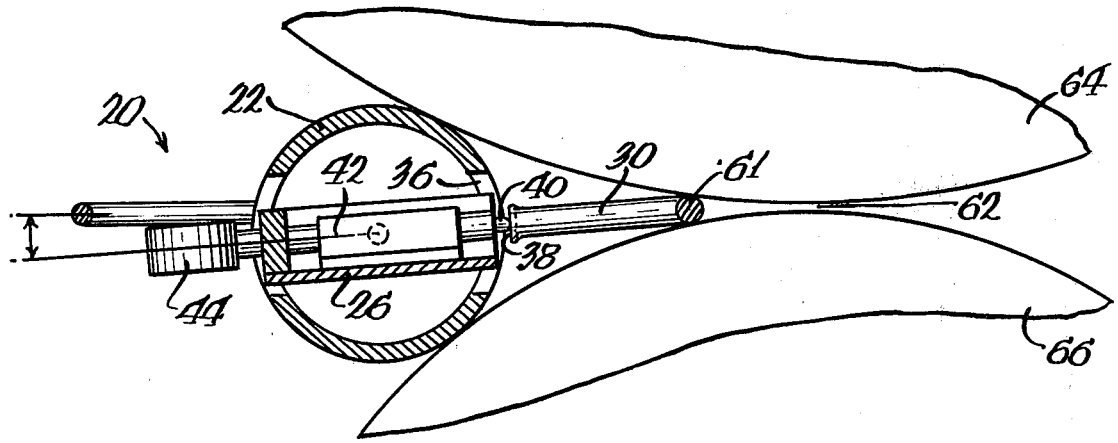
FIG. 3 is a cross-sectional, side elevation view of the gauge, showing the same in position to measure the nip between a pair of rolls of different diameters.

Another advantage obtained with the gauge of the present invention is that a great deal of care need not be exercised in aligning the gauge with the rolls to ensure accuracy of measurements. Because the platform 26 is pivotally or rotatably mounted about the axis of the cylindrical carrier 22 it is not necessary, when positioning the carrier against the rolls, to check for alignment between the probe and the carrier, inasmuch as rotation of the platform within the carrier automatically aligns the same. At the same time, pivotally mounting the platform within the carrier enables the gauge to be used with and accurately measure rolls having different diameters, for example as in FIG. 3 wherein the gauge is shown measuring the size of a nip 62 between or the radii of a roll 64 having a relatively large diameter and a roll 66 having a relatively small diameter. In particular, the pivotal mounting arrangement enables the end of the probe 30 to be fully extended into the nip to the extent of the diameter of the probe, and the carrier to be engaged with the circumference of each roll, without affecting the accuracy of measurements obtained.

Although not specifically shown, it is understood that means may be provided for adjusting the position of the transducer 42 on the platform 26, or for adjusting the relative position of the platform with respect to the axis of the carrier 22, thereby to provide a reference readout of zero from the indicator 44 for any particular point of contact of the gauge with the rolls.

While one embodiment of the invention has been described in detail, various modifications and other embodiments thereof may be devised by one skilled in the art without departing from the spirit and scope of the invention, as defined in the appended claims.

What is claimed is:

1. A gauge for measuring the nip between and/or the radii of a pair of working rolls, comprising carrier means; transducer means mounted on said carrier means for converting the width of the nip and/or the radii of the rolls into a signal; a probe formed of a quasi U-shaped bent rod pivotally connected at one end to said carrier means, extending along a medial portion thereof outwardly of said carrier means and having an opposite end positioned for movement against said transducer means to operate said transducer means to generate said signal; and means for pivotally urging said probe in a direction outwardly of said carrier means, said carrier means being dimensioned for insertion into the nip between the rolls and into contact with the rolls at a point outwardly of a centerline therebetween to bring the outermost portion of said medial portion of said probe into contact with the rolls outwardly of but closer to the centerline with said probe lying in a plane generally parallel to the axes of the rolls, said probe being pivotable against said urging means away from the centerline to move said opposite end thereof against said transducer means, whereby said transducer means converts the width of the nip and/or the radii of the rolls at the point of contact of said probe with the rolls into a signal representative thereof.

2. A gauge as in claim 1, wherein said carrier means comprises a generally tubular carrier having an opening in a surface thereof and a platform supported in said tubular carrier for pivotal movement about the axis of said tubular carrier, said transducer means being mounted on and said one end of said probe being pivotally connected to said platform and said medial portion of said probe extending outwardly of said tubular carrier through said opening, said probe lying in a plane generally parallel to said axis of said tubular carrier and said tubular carrier being insertable into the nip into line contact with each roll, said line contact extending along the surface of said tubular carrier parallel to said axis thereof.

3. A gauge as in claim 1 or 2, wherein said means for urging comprises a spring.

4. A gauge as in claim 2, wherein said transducer means comprises a dial micrometer having an actuable plunger extending outwardly therefrom, said opposite end of said probe engaging and depressing said plunger by an amount determined by the extension from said tubular carrier of said outermost portion of said probe.

5. A gauge as in claim 4, wherein said carrier has a second opening therein opposite from said first mentioned opening and an indicator dial of said dial micrometer extends outwardly of said carrier through said second opening for being viewed by a user of said gauge.

6. A gauge as in claim 1 or 2, wherein said quasi U-shaped probe is generally symmetrical so that movement of said outermost portion thereof causes a corresponding movement of said opposite end thereof against said transducer means which is twice as great.

7. A gauge as in claim 2, including a handle on said tubular carrier on a surface thereof opposite from said opening for being gripped by an operator to facilitate manipulation and use of said gauge.

8. A gauge as in claims 1 or 2, wherein said probe is generally circular in cross section and at least the outer portion of said medial portion thereof is smoothly curved, whereby said probe may be used with rolls having relatively deformable surfaces without said probe digging into or snagging on the surfaces.

9. A gauge as in claim 2, wherein said tubular carrier has closed ends and said platform is connected at opposite sides thereof with said ends by means of a pair of rods extending therebetween, said rods extending along the axis of said tubular carrier and being journaled for rotation in one of said platform and said closed ends.

* * * * *